(12) United States Patent
Kannan

(10) Patent No.: US 8,892,518 B1
(45) Date of Patent: Nov. 18, 2014

(54) SYSTEM AND METHOD OF INTELLIGENT LOG AGENTS

(75) Inventor: Suresh Kannan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 290 days.

(21) Appl. No.: 13/559,608

(22) Filed: Jul. 27, 2012

(51) Int. Cl.
*G06F 7/00* (2006.01)
*G06F 17/00* (2006.01)

(52) U.S. Cl.
USPC .......................................... 707/631; 707/633

(58) Field of Classification Search
USPC ........ 705/7.22, 7.27, 301; 707/631, 633, 640, 707/736, 770; 709/202, 224, 226
See application file for complete search history.

(56) References Cited

U.S. PATENT DOCUMENTS

| | | | | |
|---|---|---|---|---|
| 8,010,648 B2* | 8/2011 | Ogus et al. | ................... | 709/223 |
| 8,452,845 B2* | 5/2013 | Archer et al. | ................. | 709/212 |
| 8,516,149 B1* | 8/2013 | Edmett Stacey | ............. | 709/238 |
| 2011/0276396 A1* | 11/2011 | Rathod | ........................ | 707/627 |

* cited by examiner

*Primary Examiner* — Marc Filipczyk

(57) ABSTRACT

A computing system. The system comprises enterprise computers, each enterprise computer executing at least one instance of an enterprise application and executing one logging agent associated with each instance of the enterprise application; logging computers each executing at least one instance of a logging distribution application that is configured to receive logs from the logging agent application instances; and a centralized log repository computer that executes a log file manager. Each of the logging agent applications analyze a processing load of the logging computers and transmit logs to a logging computer that the logging agent application adaptively selects based on the analysis by the logging agent application of the processing load of the logging computers, wherein each logging distribution application is configured to forward logs received from logging agent applications to the centralized log repository computer, and wherein the log file manager writes the logs into log files.

6 Claims, 4 Drawing Sheets

SYSTEM AND METHOD OF INTELLIGENT LOG AGENTS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Logs may be created by executing computer programs, software, and/or applications to promote measuring the effectiveness and/or efficiency of the programs. Logs may also promote determining a source of an error and correcting an error in software. Logs may be created when signal or notable events occur in the processing of a computer program or application. Logs may be created every time a segment of code is executed, for example in a branch path that may not execute during each iteration of the subject software.

SUMMARY

In an embodiment, a computing system is disclosed. The system comprises a plurality of enterprise application execution computers, each enterprise application execution computer executing at least one instance of an enterprise application and executing one logging agent application associated with each instance of the enterprise application and a plurality of logging computers, each logging computer executing at least one instance of a logging distribution application that is configured to receive logs from the logging agent application instances. The system further comprises a centralized log repository computer that executes a log file manager. Each of the logging agent applications is configured to analyze a processing load of the logging computers and to transmit logs generated by an instance of the enterprise application to a logging computer that the logging agent application adaptively selects based on the analysis by the logging agent application of the processing load of the logging computers, and each logging distribution application is configured to broadcast an indication of the processing load of the logging computer on which the logging distribution application executes and to forward logs received from logging agent applications to the centralized log repository computer. The log file manager receives logs, purges the received logs of credit card numbers and social security numbers, and writes the purged logs into log files.

In an embodiment, a method of centralized logging is disclosed. The method comprises receiving by a logging agent an indication of a processing load from each of a plurality of logging servers, where the logging agent executes on a computer, receiving by the logging agent a log generated by an instance of an enterprise application executing on a computer, where the logging agent executes on the same computer, and based on the processing load indications, selecting by the logging agent to which one of the logging servers to transmit the log. The method further comprises transmitting by the logging agent the log to the selected logging server, and transmitting the log by the selected logging server to a centralized log repository. The method further comprises searching the centralized log repository based on information recorded in a trouble ticket and deploying a change in an enterprise application based on searching the centralized log repository and based on the information in the trouble ticket.

In embodiment, a method of centralized logging is disclosed. The method comprises sending logs from a plurality of logging agents through a plurality of distribution paths, where each logging agent receives logs from an instance of an enterprise application, wherein the logging agents execute on one or more computer. The method further comprises pushing the logs by the distribution paths to a server managing a centralized log repository. The method further comprises receiving the logs from the distribution paths by the server managing the centralized log repository and adding the logs to a plurality of log files in the centralized log repository, where each log file is associated with an enterprise application transaction type and thread number.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
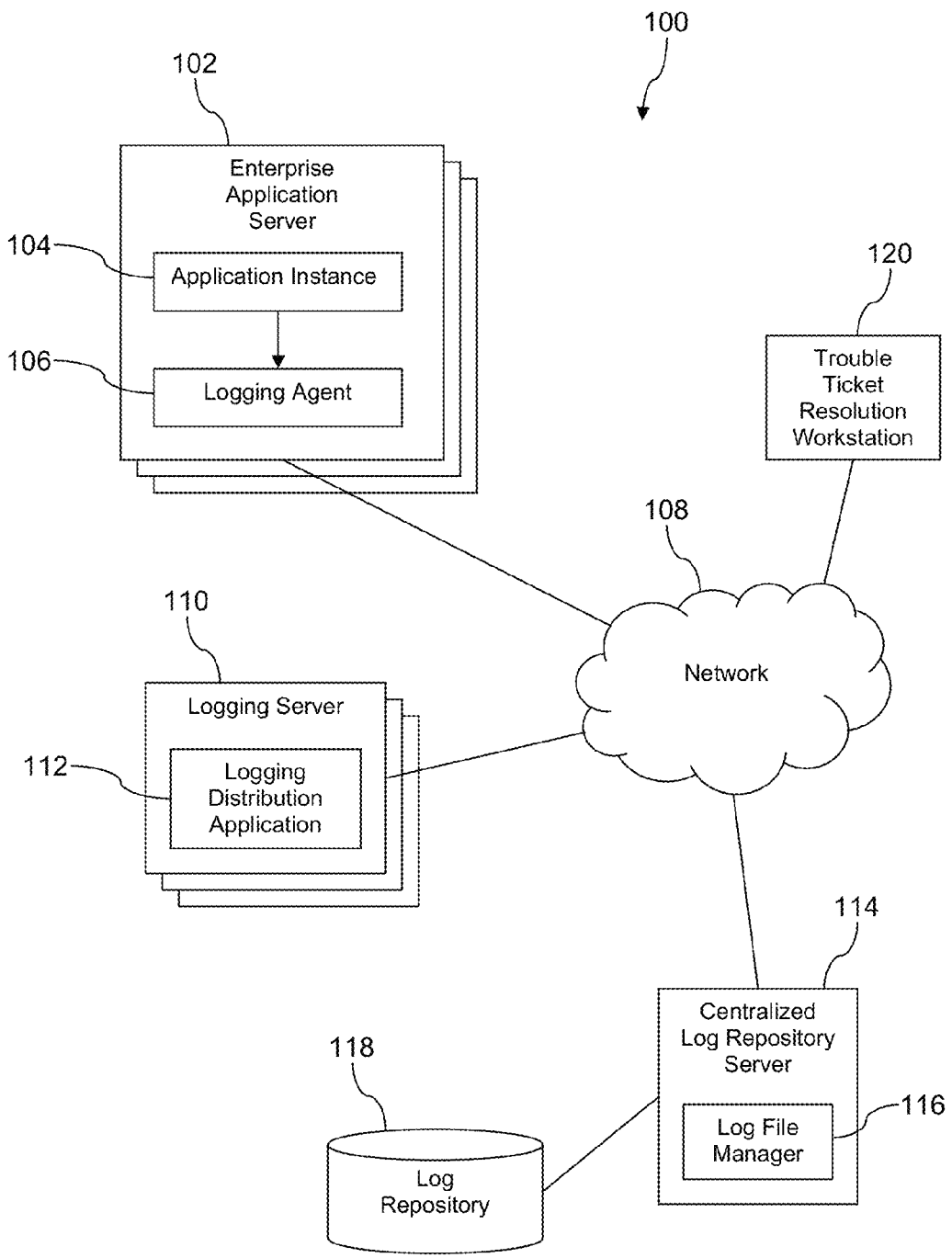
FIG. 1 is a block diagram of a logging system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system and method for intelligent log agents is taught herein. In a typical computing environment, logs may be generated and stored locally on each computer and/or server. In large computing environments, however, it may be difficult to track a trouble report back to the subject host to find a log or logs that provide information for diagnosing the experienced problem. For example, in a server farm operated by a major wireless service provider to track call activity of on the order of 50 million wireless service subscribers and processing on the order of 25 million transactions from subscribers per day there may be large numbers of servers executing the same applications in parallel.

The present disclosure contemplates centralizing logs to promote rapid, convenient analysis of trouble reports. The system may comprise a plurality of intelligent log agents that execute on the application servers, for example one intelligent log agent per application server instance or one intelligent log agent per executing application instance. It is understood that servers may be virtual servers, such that four virtual servers may execute on a single hardware server, where each virtual server may be executing an intelligent log agent. The application instances executing on the server send logs that they generate to the intelligent logging agent executing on the same server.

The intelligent log agents autonomously determine one or more log distribution paths through which to transmit their logs to the centralized log repository. The log distribution paths may be implemented by logging servers that periodically transmit their availability and/or their current processing load to a multicast internet protocol address that the intelligent agents monitor. Each intelligent log agent analyzes the current loading information multicast by the logging servers to determine to which logging servers to distribute their logs. In an embodiment, the intelligent log agents may change their log distribution by a maximum amount per load reporting period of the logging servers or during some other time period. In this way, oscillation in loading of the logging servers may be reduced and/or managed.

The logging servers manage the queuing of logs received from the intelligent logging agents and the delivery of the logs to the log repository so as to not overflow or overburden the centralized log repository. An application executing in the centralized log repository aggregates logs to different files based on log content, for example based on an application server that generated the log, a thread executing on the application server that generated the log, a time of the log, and/or based on other characteristics of the log. For example, the application executing in the centralized log repository may close an open log file after accumulating a specific number of logs, after a specific time duration, or based on some other criterion to manage the size of the log files. The application executing in the centralized log repository may further groom the logs by removing information that is not desired to be stored in the logs, for example data that the payment card industry (PCI) standards prohibit from being stored in generic databases. The application executing in the centralized log repository may purge the logs of credit card numbers and/or social security numbers.

The centralized log repository may be used in a variety of ways to support management and maintenance of the computing environment. For example, when a problem is reported, such as a specific transaction failure, a technician may search in the centralized log repository based on the information about the transaction failure. The centralized log repository may be searched based on a time of the transaction failure, based on an identity of a customer associated with the transaction failure, and/or based on other information provided with a trouble ticket report. When one or more logs are found, the technician may analyze the subject logs to determine further information related to the transaction failure. For example, one of the logs may indicate that a processing exception was raised due to an invalid data input, and the transaction failed because of the processing exception. A different log may indicate that the data input was initially input as valid data. Thus, the cause of failure may be determined to have been due to a bug in an intermediate software component that corrupted the data input before invoking the subject transaction processing. This trouble ticket investigation approach contrasts with the difficulty presented by finding the appropriate log for the failed transaction on an unknown one of the many servers when log files are maintained on the individual servers.

Turning now to FIG. 1, a logging system 100 is described. In an embodiment, the system 100 comprises a plurality of enterprise application servers 102, each of which execute at least one application instance 104 and an intelligent logging agent 106. The system 100 further comprises a plurality of logging servers 110 each executing at least one logging distribution application 112. The system 100 further comprises a log repository 118 that is mediated and/or managed by a centralized log repository server 114 that executes a log file manager application 116. The enterprise application servers 102, the logging server 110, and the centralized log repository server 114 are communicatively coupled by a network 108 that comprises one or more private networks, one or more public networks, or a combination thereof. In an embodiment, the system 100 may further comprise one or more trouble ticket resolution workstations 120 communicatively coupled to the network 108. The centralized log repository server 114 may access the log repository 118 via a data store server (not shown) that manages access to the log repository 118 and presents a data store application programming interface (API) for use of the centralized log repository server 114 and/or the log file manager 116. The servers 102, 110, 114 and the trouble ticket resolution workstation 120 may be implemented as computers or computer systems. Computers and computer systems are described further hereinafter.

It is understood that the system 100 may comprise any number of enterprise application servers 102. In an embodiment, there may be hundreds or thousands of enterprise application servers 102. It is also understood that the system may comprise any number of logging servers 110. The enterprise application servers 102 may comprise virtual servers, where two or more enterprise application servers 102 may execute as virtual servers on a single physical server computer.

The application instances 104 may be instances of front-end applications, back-end applications, or other kinds of applications. The application instances 104 may provide billing functionality, subscriber account management functionality, and other functionality. The application instances 104 may execute substantially continuously, 24 hours per day and 7 days per week. The application instances 104 may experience loading cycles where the processing load may be very high at one time and moderate or low at another time.

As the application instances 104 execute they generate logs that they send to the intelligent logging agent 106. The logs may comprise an identification of the enterprise application server 102 on which the application instance 104 executes, a thread associated with the execution that generated the log, a time and date stamp, and the information that the specific log is configured to contain. Logs may be designed or configured by software developers who wrote the code implementing the application software. Different logs generated at different points in the application software may comprise different data. Some logs may comprise error indications, for example when the application executes error handling routines. Other logs may comprise indications of what path a given transaction has followed. Some logs may be generated by the operating system software and/or virtual management software that provide an execution environment for the enterprise application server 102.

It is understood that logs are distinct from the outputs produced by the application instances 104 in providing their expected functionality. For example, logs are different from call detail records (CDRs) produced by a billing system, logs are different from reports about enterprise business activities conducted by the application instances 104. By contrast, logs contain information about the execution and workings of the software that implements the application instances 104 and the enterprise application servers 102.

The intelligent logging agent 106 may be referred to in some contexts as a logging agent 106. The logging agent 106 autonomously chooses a distribution path by which to transmit the logs it receives to the centralized log repository server 114. The plurality of logging distribution servers 110 and/or logging distribution applications 112 comprise different distribution paths. The logging agent 106 periodically receives information from the logging servers 110 indicating the processing loads and/or depth of log queues present on the logging servers 110. Based on the processing loads and/or depth of log queues of the logging servers 110, the logging agent 106 chooses one or more of the logging servers 110 to which to send logs for transmitting to the centralized log repository server 114. In an embodiment, if no logging servers 110 are available to receive logs from the logging agent 106, the logging agent 106 will store the logs locally on the enterprise application server 102. Later, when one or more logging servers 110 are brought back into service, the logging agent 106 resumes sending newly created logs to the one or more logging servers 110 as well as sending the locally stored logs to the one or more logging servers 110.

The logging agent 106 may execute a distribution routine to determine how to distribute the logs that it receives. This distribution routine may be said to dynamically adapt the log distribution based in part on the information about processing loads and/or log queues associated with the logging servers 110. The distribution routine may also adapt the log distribution based in part on a rate at which it is receiving new logs. For example, in one circumstance, the logging agent 106 may be distributing about 60% of its logs to a first logging server 110 and about 40% of its logs to a second logging server 110, and both the first and second logging servers 110 may be substantially fully loaded. If the rate at which the logging agent 106 receives logs increases by 10%, the logging agent 106 may decide to dynamically adapt the distribution of its logs to send 50% of its logs to the first logging server 110, 30% of its logs to the second logging server 110, and 20% of its logs to a third logging server 110 that is not fully loaded. In an embodiment, the distribution routine may limit the amount of log distribution change permitted from one period of information transmission by the logging servers 110 to the next period, as a strategy to avoid the loads on the logging servers 110 oscillating.

The logging distribution application 112 determines the processor loading and/or the log queue depth (e.g., the number of logs that are enqueued waiting to be transmitted to the centralized log repository server 114). Periodically the logging distribution application 112 sends its current processor loading and/or log queue depth information to a multicast internet protocol address, on a channel dedicated to that logging server 110. Along with the current status, the logging distribution application 112 sends its individual internet protocol address, and logging agents 106 send logs to that logging server 110 by addressing the transmission of logs to that internet protocol address. Logging servers 110 may periodically check with other logging servers 110 to confirm that the other logging servers 110 are still active, for example by periodically pinging one or more of the other logging servers 110. When a logging server 110 determines that another logging server 110 that previously announced its availability to process logs is not responsive, the logging server 110 may multicast a message indicating the subject logging server 110 is out-of-service. For example, the logging distribution application 112 may send a ping message to one or more other logging servers 110. If the subject logging distribution application 112 does not receive a reply to a ping message, the subject logging distribution application 112 may determine that the unresponsive logging server 110 is crashed or is otherwise out-of-service. The subject logging distribution application 112 may multicast a message, for example to the logging agents 106 and/or the other logging servers 1120 indicating that the unresponsive logging server 110 is out-of-service. The subject logging distribution application 112 may shut down a channel of the multi-cast internet protocol address associated with the logging server that is crashed or out-of-service. In this way, logging agents 106 do not continue to send logs to the out-of-service logging server 110.

The log file manager 116 processes logs that are received by the centralized log repository server 114. In an embodiment, the centralized log repository server 114 may execute a plurality of instances of the log file manager 116. Alternatively, in an embodiment, the centralized log repository server 114 may comprise a plurality of virtual servers and/or a plurality of physical servers. The log file manager 116 may analyze the incoming logs to groom them of undesired information. For example, the log file manager 116 may remove information such as credit card numbers, social security numbers, and other confidential information that the payment card industry (PCI) standards prohibit from being stored in generic databases, for example in the log repository 118. After grooming the incoming logs, the log file manager 116 writes the groomed logs to the log repository 118. In an embodiment, the log file manager 116 may write the groomed logs to the log repository 118 via the intermediary of a data store server or data base application programming interface (API).

When an error occurs in the processing of application instances 104, enterprise employees responsible for troubleshooting the applications, may use the trouble ticket resolution workstation 120 to search the logs stored in the log repository 118. The workstation 120 may access the log repository 118 via the centralized log repository server 114 and/or through accessing a data store server that manages the log repository 118. The user of the workstation 120 may execute a variety of tools for searching the log repository 118 to find logs germane to a trouble ticket. For example, the user of the workstation 120 may execute SQL commands or UNIX commands such as grep to locate logs of interest. The user of the workstation 120 need not know in advance what enterprise application server 102 may have generated the logs of interest, because the logs are collected together.

When the user of the workstation 120 determines the root cause of the problem reported in the trouble ticket, the user may define a corrective action to be taken and/or implement the corrective action. In some cases, the corrective action may involve design changes and/or software changes to the application instances 104 or the enterprise application servers 102, and this corrective action may need to be implemented according to a change process. The further response to the root cause of the problem may involve estimating a level of effort to design the change, securing budget to accomplish the change, scheduling the design effort, designing the change, testing the change in an off-line environment, coordinating and/or scheduling the deployment of the change to the system 100, validating the trouble reported in the trouble ticket cannot be duplicated, and then closing the subject trouble ticket. It will be appreciated by one skilled in the art that this response scenario is one of many different response scenarios that may address and/or fix the trouble ticket.

Figure 2:
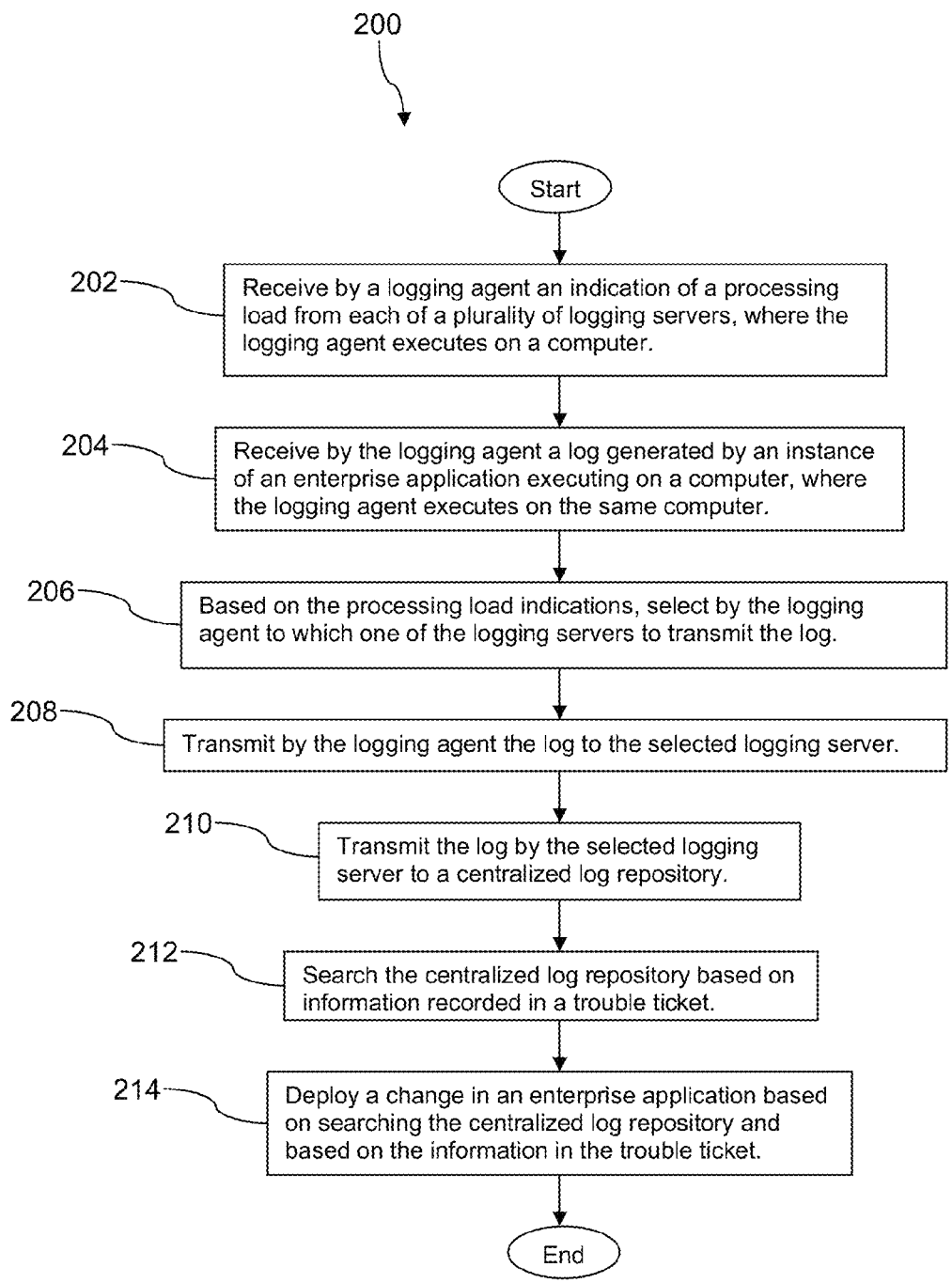
FIG. 2 is a flow chart of a method according to an embodiment of the disclosure.

Turning now to FIG. 2, a method 200 is described. At block 202, receive by a logging agent an indication of a processing load from each of a plurality of logging servers, where the logging agent executes on a computer. The indication of the processing load of the logging servers may be received by the logging agent at different times where the times are not coordinated with each other. For example, each of the logging servers may send processing load and/or log queue depth information periodically, but each logging server may transmit periodically without coordinating timing with the other logging servers. At block 204, receive by the logging agent a log generated by an instance of an enterprise application executing on a computer, where the logging agent executes on the same computer. Alternatively, the logging agent may receive a log generated by an operating system or virtual management application that provides an execution environment for the application instance 104.

At block 206, based on the processing load indications, select by the logging agent to which one of the logging servers to transmit the log. The logging agent may determine to send all of its logs to a logging server that it has selected based on the loading and/or log queue depth information received from the logging servers. Alternatively, the logging agent may determine to distribute its logs to a plurality of logging servers, for example sending a dynamically determined percentage of its logs to each of the several logging servers selected. The logging agent may analyze the processing load indications on a periodic basis and refresh its determination of which logging server or logging servers to distribute its logs to and/or what percentage of logs to distribute to selected logging servers. The logging agent may be configured to change its distribution of logs among logging servers by a maximum amount per adaptation cycle, whereby to reduce the chances of inducing oscillations in the loading on the logging servers. The redetermination by the logging agent of its distribution of logs to the logging servers may be referred to as dynamic adaptation. It is understood that, in an embodiment, each log agent determines the distribution of its logs to the logging servers independently of other log agents and without being commanded how to distribute its logs from an external source. At block 208, transmit by the logging agent the log to the selected logging server. At block 210, transmit the log by the selected logging server to a centralized log repository.

In an embodiment, the method 200 may further comprise steps of a technician searching the logs for logs related to a trouble ticket identifying an execution problem, a transaction failure, or some other operating event of the system 100. At block 212, search the centralized log repository based on information recorded in a trouble ticket. For example, the technician or another searches the centralized log repository without having to know the specific application server that may have experienced a problem or transaction failure. The technician may use creative thinking and intuition to generate a number of possible explanations for the problem. The technician may search for other logs to further substantiate a possible explanation or to eliminate a possible explanation.

At block 214, deploy a change in an enterprise application based on searching the centralized log repository and based on the information in the trouble ticket. When the technician settles on an explanation, a problem solution may be analyzed and deployed. For example, the technician may define a corrective action to be taken and/or implement the corrective action. In some cases, the corrective action may involve design changes and/or software changes to the application instances 104 or the enterprise application servers 102, and this corrective action may need to be implemented according to a change process. The further response to the root cause of the problem may involve estimating a level of effort to design the change, securing budget to accomplish the change, scheduling the design effort, designing the change, testing the change in an off-line environment, coordinating and/or scheduling the deployment of the change to the system 100, validating the trouble reported in the trouble ticket cannot be duplicated, and then closing the subject trouble ticket. It will be appreciated by one skilled in the art that this response scenario is one of many different response scenarios that may address and/or fix the trouble ticket.

Figure 3:
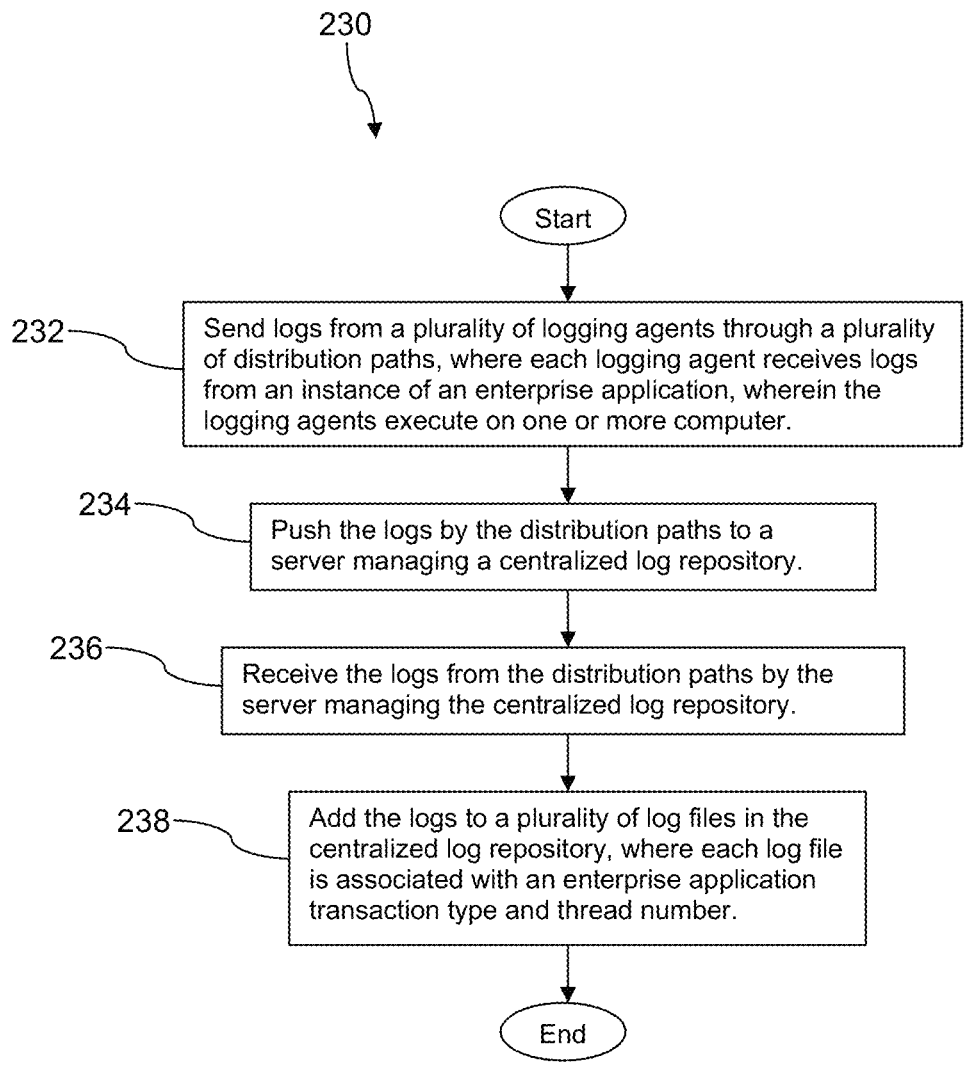
FIG. 3 is a flow chart of another method according to an embodiment of the disclosure.

Turning now to FIG. 3, a method 230 is described. At block 232, send logs from a plurality of logging agents through a plurality of distribution paths, where each logging agent receives logs from an instance of an enterprise application, from the operating system, or from an application providing an execution environment, wherein the logging agents execute on one or more computer. The plurality of distribution paths may be provided by the logging servers 110. At block 234, push the logs by the distribution paths to a server managing a centralized log repository. At block 236, receive the logs from the distribution paths by the server managing the centralized log repository. In an embodiment, the server managing the centralized log repository grooms the logs by removing confidential information such as credit card numbers and social security numbers from the logs. At block 238, add the logs to a plurality of log files in the centralized log repository, where each log file is associated with an enterprise application transaction type and thread number. In an embodiment, the groomed logs are added to or written to the log files in the centralized log repository.

Figure 4:
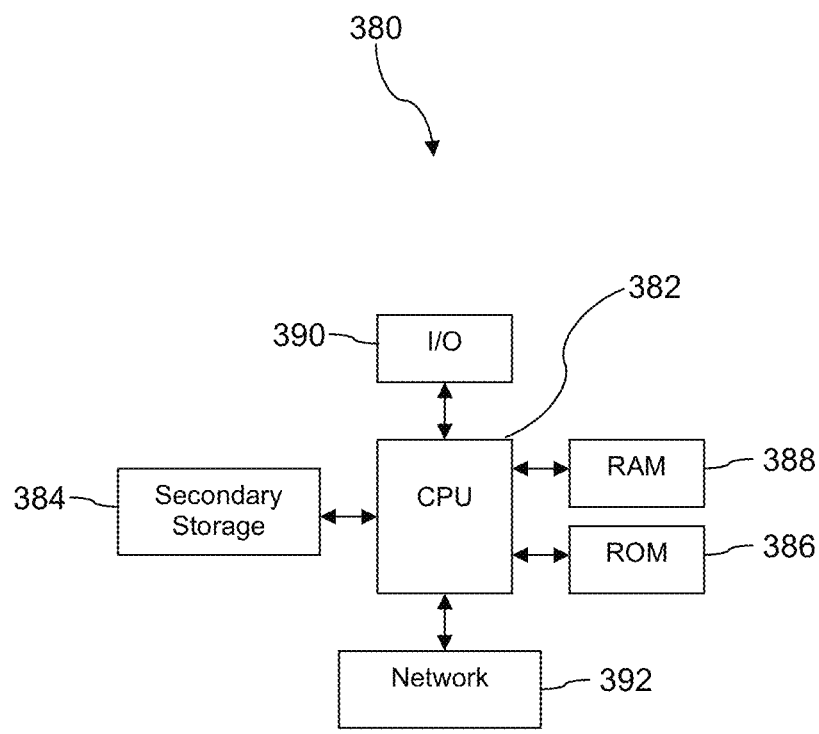
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computing system, comprising:
a plurality of enterprise application execution computers, each enterprise application execution computer executing at least one instance of an enterprise application and executing one logging agent application associated with each instance of the enterprise application;
a plurality of logging computers, each logging computer executing at least one instance of a logging distribution application that is configured to receive logs from the logging agent application instances; and
a centralized log repository computer that executes a log file manager,
wherein each of the logging agent applications is configured to analyze a processing load of the logging computers and to transmit logs generated by an instance of the enterprise application to a logging computer that the logging agent application adaptively selects based on the analysis by the logging agent application of the processing load of the logging computers,
wherein each logging distribution application is configured to broadcast an indication of the processing load of the logging computer on which the logging distribution application executes and to forward logs received from logging agent applications to the centralized log repository computer, and
wherein the log file manager receives logs, purges the received logs of credit card numbers and social security numbers, and writes the purged logs into log files.

2. The system of claim 1, wherein each logging distribution application broadcasts the indication of the processing load to a multi-cast internet protocol address.

3. The system of claim 2, wherein each logging distribution application broadcasts the indication of the processing load to a channel of the multi-cast internet protocol address, where the channel is associated specifically with that logging distribution application.

4. The system of claim 3, wherein each logging distribution application broadcasts its own internet protocol address in the channel of the multi-cast internet protocol address.

5. The system of claim 3, wherein each logging distribution application is configured to shut down a channel of the multi-cast internet protocol address associated with a logging computer that has crashed.

6. The system of claim 5, wherein a logging distribution application determines that a logging computer has crashed by sending a ping communication to the logging computer that is not replied to.

* * * * *